United States Patent [19]

Joly et al.

[11] Patent Number: 5,241,093

[45] Date of Patent: Aug. 31, 1993

[54] PROCESS FOR PREPARING ALUMINOPHOSPHATE COMPOUNDS AND SUBSTITUTED DERIVATIVES OF THE STRUCTURAL TYPE VFI

[75] Inventors: Jean-Francois Joly, Paris; Hervé Cauffriez, Bougival; Jean-Louis Guth, Mulhouse, all of France

[73] Assignee: Institut Francais du Petrole, France

[21] Appl. No.: 822,852

[22] Filed: Jan. 21, 1992

[30] Foreign Application Priority Data

Jan. 18, 1991 [FR] France ................................ 91 00658

[51] Int. Cl.$^5$ ............................ C07F 7/02; C07F 5/06
[52] U.S. Cl. .................................... 556/9; 556/14; 556/24; 556/130; 556/146; 556/173; 556/174; 502/210; 502/214; 423/305; 423/306; 423/705
[58] Field of Search ................. 556/9, 14, 24, 130, 556/146, 173, 174; 502/210, 214; 423/305, 306, 329

[56] References Cited

U.S. PATENT DOCUMENTS 5,045,293 9/1991 Clark et al. ..................... 423/305

Primary Examiner—José G. Dees
Assistant Examiner—Porfirio Nazario
Attorney, Agent, or Firm—Antonelli, Terry, Stout & Kraus

[57] ABSTRACT

A process for preparing aluminophosphate compounds (and substituted derivatives) of the structural type VFI. This preparation process is characterized in that the speed of increase in temperature of the reaction mixture is greater than 250° C./hour, the total time of heating of the reaction mixture, including the rise in temperature and the plateau heating, being less than one hour. The temperature of the plateau heating is between 100° and 200° C.

The synthetic compounds in accordance with the invention possess (a) a general formula approximating to the following:

$$1\ Al_2O_3\ 0.75\text{-}1.25\ P_2O_5\ 0\text{-}0.5\ XO_{n/2}\ 0\text{-}0.05\ R\ y\ H_2O$$

where
X represents a heteroatom chosen from the group consisting of silicon, cobalt, magnesium and zinc;
n is the degree of oxidation of the heteroatom X;
y, the number of water molecules contained in the said compound, is greater than 0.001; and
R is an organic compound chosen from the group consisting of secondary amines, tertiary amines, and quaternary ammonium salts and hydroxides;
(b) an X-ray diffraction diagram as represented in Table I of the description.

7 Claims, No Drawings

PROCESS FOR PREPARING ALUMINOPHOSPHATE COMPOUNDS AND SUBSTITUTED DERIVATIVES OF THE STRUCTURAL TYPE VFI

The present invention concerns a novel process for preparing aluminophosphate compounds and their substituted derivatives of the structural type VFI.

Molecular sieves (microporous crystalline solids) have been known for many years. In general two families may be distinguished: 1. zeolites (aluminosilicates) and 2. other molecular sieves that are not aluminosilicates (quasi-zeolithic solids). In the second category of molecular sieves are found crystalline aluminophosphate compounds (see for example U.S. Pat. No. 4,310,440). Crystalline aluminophosphate compounds in which silicon is incorporated, which are in that case called silicoaluminophosphates, can present ion-exchange capacities as well as acidic properties, which makes it possible to use them in acid catalysis. These properties are also commonly found when one of the elements Co, Mg, Zn and Mn is included in the lattice of the aluminophosphates.

Like zeolites, the great majority of compounds of the crystalline aluminophosphate type (and their substituted derivatives) contain a microporous network of which the diameter of the pore openings is in general between 2 and 7.4 angstroms (7.4 angstroms being a value which corresponds to a pore opening limited by an outline of 12 oxygen atoms). Very recently the production of aluminophosphate compounds and substituted derivatives characterised by pore-opening diameters greater than 7.4 angstroms has been reported. For example, Dessau et al. describe in "Zeolites, 1990, vol. 10, p. 522" the crystallographic structure of the aluminophosphate called AlPO$_4$-8, this structure being characterised by a unidimensional porous network in which the elliptical pore opening is 7.9 angstroms by 8.7 angstroms. This structure is also characterised by the pore-openings being limited by an outline of 14 oxygen atoms.

The synthesis of aluminophosphate compounds (and substituted derivatives) of which the pore openings are limited by an outline of eighteen oxygen atoms, which corresponds to a pore diameter around 12 angstroms, has been described in several patent applications or patents (WO 89/01912, WO 89/05775, WO 89/09748, WO 89/09749 and U.S. Pat. No. 4,673,559).

Patent application Ser. No. WO 89/01912 describes the synthesis of crystalline microporous aluminophosphate compounds capable of absorbing molecules having a kinetic diameter between 3 and 14 angstroms. This product is called VPI-5; the structural commission of the International Zeolite Association has chosen the term VFI as the code for the structure VPI-5. The synthesis of this VPI-5 of VFI structure is characterised in that the reaction medium contains a source of aluminium, phosphorus and an organic compounds. The solid VPI-5 is obtained by heating the reaction medium in an autoclave at a temperature between 50° and 200° C., the period of heating being between 1 and 50 hours. This use of heating times less than 1 hour leads to amorphous or incompletely crystallised products.

Patent application Ser. No. WO 89/05775 concerns the synthesis of a crystalline aluminophosphate compound have an X-ray diffraction diagram containing the principal lines chracterising the structural type VFI. The crystalline solid is obtained after heating over a duration that can be as much as eighty hours. The reaction medium contains an organic compound. Likewise, Patent application Ser. No. WO 89/09749 describes the synthesis of crystalline aluminophosphate compounds having X-ray diffraction diagrams characteristic of the structural type VFI and resembling those compounds described in patent application Ser. No. WO 89/09748, the synthesis being carried out in the presence of an organic agent of the quaternary ammonium salt type.

U.S. Pat. No. 4,673,559 describes the production of silicoaluminophosphate compounds in a biphasic medium.

The present invention concerns a new process for obtaining aluminophosphate compounds and their substituted derivatives of the structural type VFI. This new procedure is characterised in that the rate of increase in temperature of the reaction mixture is as fast as possible, i.e. greater than 250° C./hour and preferably greater than 400° C./hour. Thus, the total duration of the heating of the homogenised reaction medium which is the sum of the times necessary to attain the temperature of synthesis and the plateau of the temperature of synthesis needed to obtain a very well crystallised solid of the VFI type, is less than 1 hour.

Numerous methods can be used to obtain the most rapid possible increase in the temperature of the reaction medium. In accordance with such methods, there may be mentioned the use of metallic autoclaves which are plunged into a liquid bath at the desired temperature, the use of a continuous flow reactor, or the use of microwave heating.

The principal advantage resulting from the most rapid possible increase in reaction temperature is that, in a heating time less than 1 hour, very well crystallised aluminophosphate solids of the structural type VFI can be obtained. Moreover, under these synthesis conditions, inexpensive organic agents such as dipropylamine can advantageously be used.

Another advantage resulting from the process of synthesis of aluminophosphate compounds of the VFI type in accordance with the invention is that it leads to the production of solids having fewer lattice defects than VFI-type solids of the prior art. In fact, in the NMR spectrum of $^{31}P$ of the VFI-type solid obtained in accordance with the invention, the peak at 24 ppm is not greater with respect to the two other peaks present in the spectrum. On the other hand, the NMR spectra of $^{31}P$ of solids of the structural type VFI disclosed in the literature have a peak at 24 ppm magnified with respect to the other two peaks (see for example M E Davis, C Montes, P Hathaway, D Hasha and J Garces, J Am. Soc., 111, 3921, 1989).

The aluminophosphate compound of structural type VFI obtained in accordance with the process of the invention possesses:

(a) a general formula approximating to the following:

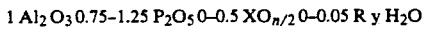

1 Al$_2$O$_3$ 0.75–1.25 P$_2$O$_5$ 0–0.5 XO$_{n/2}$ 0–0.05 R y H$_2$O where

X represents a heteroatom chosen form the group consisting of silicon, cobalt, magnesium and zinc;

n is the degree of oxidation of the heteroatom X;

y, the number of water molecules contained in the said compound, is greater than 0.001; and R is an organic compound chosen from the group consisting of secondary amines, tertiary amines, and quaternary ammonium salts and hydroxides;

(b) an X-ray diffraction diagram as represented in Table I of the description.

The process for preparing the aluminophosphate compounds of structural type VFI (and substituted derivatives) according to the invention comprises:

(a) Preparing a reaction mixture containing water, at least one source of aluminium, at least one source of phosphorus, at least one source of an organic compound chosen from the group consisting of secondary amines, tertiary amines, and quaternary ammonium hydroxides and salts, possibility at least one source of a heteroatom selected from the group consisting of silicon, cobalt, magnesium and zinc, the said reaction mixture having a composition, in terms of molar ratio, within the intervals of the following values:

$P_2O_5/Al_2O_3$: 0.75-1.25, preferably 0.90-1.10
$XO_{2/n}/Al_2O_3$: 0-2, preferably 0-1.50
$R/Al_2O_3$: 0.001-2, preferably 0.80-1.20
$H_2O/Al_2O_3$: 25-100, preferably 35-70

In a preferred fashion, the reaction mixture is produced by adding the aluminium source to a solution containing water and the source of phosphorus. The mixture thus obtained is usually stirred for a period for example from several minutes to 2 hours. The source of the heteroatom X can then be added to the reaction mixture. The organic compound, preferably di-N-propylamine or di-N-butylamine, is then added to the reaction mixture. The reaction mixture is then homogenised with agitation over a period of from several minutes to several hours.

(b) The reaction mixture is then submitted to an increase in temperature at a rate greater than 250° C./hour, preferably greater than 400° C./hour, to a heating temperature between 100° and 200° C., preferably between 125° and 160° C., and is then maintained at this heating temperature until a crystalline solid is obtained, the total duration of the heating (increase in temperature + maintenance of heating temperature) or duration of step (b) being less than 1 hour. This step (b) is advantageously carried out in a metallic autoclave, the reaction mixture being in contact with the metallic walls of the autoclave. The use of total heating times equal to or greater than 1 hour leads particularly to the appearance of undesired phases.

The crystalline solid, separated form the mother liquors, is in the form of needle-like aggregates of mean diameter 80 to 100 microns; the use of a sieve permits of advantageous recovery of the crystals by eliminating the unreacted aluminium source. Usually, the solid is then washed with distilled water.

According to a preferred embodiment of the invention, the molar ratios of the constituents of the reaction mixture are contained in the following ranges:
$P_2O_5/Al_2O_3$: 0.90-1.10
$XO_{2/n}/Al_2O_3$: 0-1.50
$R/Al_2O_3$: 0.90-1.10
$H_2O/Al_2O_3$: 35-50

It is advantageous to work in a stirred medium during step (b).

Numerous sources of aluminium and phosphorus can be used. Among sources of aluminium used, pseudoboehmite is preferably chosen. Among sources of phosphorus used, orthophosphoric acid is preferably chosen.

The identification of the aluminophosphate solids (and substituted derivatives) of structural type VFI in accordance with the invention can be carried out easily starting from their X-ray diffraction diagram. This diffraction diagram can be obtained with a diffractometer using the conventional powder method with copper $K_\alpha$ radiation. An internal standard permits of precise determination of the values of the angles $2\theta$ associated with the diffraction peaks. The interlattice distances $d_{hkl}$, which are characteristic of the standard, are calculated by the Bragg equation. Estimation of the measuring error $\Delta$ ($d_{hkl}$) with respect to $d_{hkl}$ is calculated as a function of the absolute error $\Delta$ ($2\theta$) appropriate to the measurement of $2\theta$ by the Bragg equation. In the presence of an internal standard, this error is minimized and currently taken as equal to $\pm 0.05°$ C. The relative intensity $I/I_o$ provided by each value of $d_{hkl}$ is estiamted with respect to the height of the corresponding diffraction peak. The latter can also be determined starting from a plate obtained using a Debye-Scherrer chamber.

Table I represents the X-ray diffraction diagram characterising aluminophosphate solids (and substituted derivatives) of the structural type VFI according to the invention. Each value $d_{hkl}$ can be affected by an error in measurement usually between $\pm 0.5$ and $\pm 0.002$ depending on the value of $2\theta$ ($d_{hkl}$ is expressed in angstroms, 1 Å = $10^{-10}$m).

The following examples illustrate the invention without in any way limiting its scope.

TABLE I

| $2\theta$ | $d_{hkl}$ | $I/I_o$ |
| --- | --- | --- |
| 5.35 | 16.49 | 100 |
| 9.29 | 9.50 | 1 |
| 10.74 | 8.23 | 13 |
| 14.28 | 6.20 | 2 |
| 16.14 | 5.49 | 1 |
| 18.68 | 4.75 | 5 |
| 21.66 | 4.10 | 7 |
| 21.88 | 4.06 | 5 |
| 22.34 | 3.98 | 4 |
| 22.58 | 3.93 | 3 |
| 23.56 | 3.77 | 7 |
| 24.80 | 3.59 | 3 |
| 26.03 | 3.42 | 1 |
| 27.14 | 3.28 | 9 |
| 28.20 | 3.16 | 3 |
| 28.93 | 3.08 | 2 |
| 29.42 | 3.03 | 1 |
| 30.24 | 2.95 | 5 |
| 30.82 | 2.90 | 2 |
| 32.65 | 2.74 | 5 |
| 34.04 | 2.63 | 2 |
| 35.96 | 2.50 | 1 |
| 38.27 | 2.35 | 1 |

EXAMPLE 1

23 g of orthophosphoric acid (85% $H_3PO_4$) is added to 73 g of water; 14.6 g of pseudoboehmite (Catapal B Vista product) is then added to the solution. The resulting mixture is stirred for 2 hours at ambient temperature. 10.1 g of di-N-propylamine (DPA) is added and stirring is continued for 2 more hours.

The reaction mixture has, in terms of molar ratio, the following composition:

1 $Al_2O_3$, 1 $P_2O_5$, 1 DPA, 45 $H_2O$

The reaction mixture is transferred to a metal autoclave. The autoclave is immersed for 45 minutes in a bath at 135° C.; the rate of increase in temperature of the reaction mixture is in the neighbourhood of 600° C./hour. The autoclave is then cooled in a current of cold air. The crystalline solid obtained is separated form the other liquors by filtration on a sieve and is washed with distilled water and then dried overnight at ambient temperature.

The resulting solid is characterised by an X-ray diffraction diagram identical with that of Table I of the present description.

EXAMPLE 2

23 g of orthophosphoric acid (85% $H_3PO_4$) is added to 55 g of water. 14.6 g of pseudoboehmite (Catapal B Vista product) is then added to the solution. The mixture thus obtained is stirred for 1 hour at ambient temperature. 15 g of colloidal silica (Ludox AS 40) is then added to the reaction mixture; stirring is continued for 1 hour. 10.1 g of di-N-propylamine (DPA) is then added; stirring of the mixture thus obtained is then continued for 2 hours.

The reaction mixture has, in terms of molar ratio, the following composition:

1 $Al_2O_3$, 1 $P_2O_5$, 1 $SiO_2$, 1 DPA, 40 $H_2O$

The reaction mixture is then transferred to a metallic autoclave which is immersed in a bath at 135° C. for 15 minutes. The autoclave is then cooled with a current of cold air.

The crystalline solid is separated from the mother liquors by filtration on a sieve and is washed with distilled water and then dried overnight at ambient temperature. It has an X-ray diffraction diagram identical with that of Table I of the present description. The solid has a silica content of 5% by weight.

EXAMPLE 3

11.5 g of orthophosphoric acid (85% $H_3PO_4$) is added to 32 g of water. 7.3 g of pseudoboehmite is then added. The mixture thus obtained is stirred for 1 hour. 7.5 g of colloidal silica (Ludox AS 40) is then added to the mixture which is stirred for 1 hour at ambient temperature. 5 g of di-N-propylamine (DPA) is then added and the reaction mixture is stirred for 2 hours.

The reaction mixture has, in terms of molar ratio, the following composition:

1 $Al_2O_3$, 1 $P_2O_5$, 1 $SiO_2$, 1 DPA, 45 $H_2O$

The reaction mixture is then transferred to a metallic autoclave which is immersed in a bath at 135° C. for 45 minutes. The autoclave is then cooled by a current of cold air.

The crystalline solid is separated from the mother liquors by filtration on a sieve and is washed with distilled water and then dried overnight at ambient temperature. It has an X-ray diffraction diagram identical with that of Table I of the present description. The solid contains 5.5% silicon by weight.

We claim:

1. A process for the preparation of a compound of the VFI structure having:
   (a) a general formula approximating to the following:

1 $Al_2O_3$ 0.7–1.25 $P_2O_5$ 0–0.5 $XO_{n/2}$ 0–0.05 R y $H_2O$ where
X represents a heteroatom chosen from the group consisting of silicon, cobalt, magnesium and zinc;
n is the degree of oxidation of the heteroatom X;
y, the number of water molecules contained in the said compound, is greater than 0.001; and
R is an organic compound chosen from the group consisting of secondary amines, tertiary amines, and quaternary ammonium salts and hydroxides;
   (b) an X-ray diffraction diagram as presented in Table I of the description, in which
   (1) there is formed a reaction mixture comprising water, at least one source of aluminium, at least one source of phosphorus, at least one source of organic compound chosen from the group consisting of secondary amines, tertiary amines, and quaternary ammonium hyroxides and salts, possibly at least one source of a heteroatom selected from the group consisting of silicon, cobalt, magnesium and zinc, the said reaction mixture having a composition, in terms of molar ratio, within the intervals of the following values:
   $P_2O_5/Al_2O_3$: 0.75–1.25
   $XO_{2/n}/Al_2O_3$: 0.2
   $R/Al_2O_3$: 0.001–2
   $H_2O/Al_2O_3$: 25–100
   (2) the reaction mixture is then submitted to a temperature increase at a rate greater than 250° C./hour to a heating temperature between 100° and 200° C., and is then maintained at this heating temperature until a crystallised sold is obtained, the total duration of heating being less than 1 hour, and the crystallised solid is recovered from the reaction mixture.

2. A process according to claim 1 in which in step (1) the reaction mixture has a composition, in respect of molecular ratio, within the following ranges:
   $P_2O_5/Al_2O_3$: 0.90–1.10
   $XO_{2/n}/Al_2O_3$: 0–1.50
   $R/Al_2O_3$: 0.80–1.20
   $H_2O/Al_2O_3$: 35–70.

3. A process according to claim 1 in which in step 2) the rate of increase in temperature is greater than 400° C./hour.

4. A process according to claim 1 in which the heating temperature is between 125° and 160° C.

5. A process according to claim 1 in which the heteroatom is silicon.

6. A process according to claim 1 in which the organic compound is di-N-propylamine or di-N-butylamine.

7. A process according to claim 1 in which recovery of the crystallised solid is effected by separating the crystallised solid from mother liquors, by washing the recovered crystallised solid with water, and then by drying the crystallised solid.

* * * * *